(12) United States Patent
Love et al.

(10) Patent No.: US 6,546,229 B1
(45) Date of Patent: Apr. 8, 2003

(54) METHOD OF SINGING INSTRUCTION

(76) Inventors: Roger Love, 3074 N. Lima St., Burbank, CA (US) 91504; Scott Alberts, 3074 N. Lima St., Burbank, CA (US) 91504

( * ) Notice: Subject to any disclaimer, the term of this patent is extended or adjusted under 35 U.S.C. 154(b) by 0 days.

(21) Appl. No.: 09/721,196

(22) Filed: Nov. 22, 2000

(51) Int. Cl.[7] ............................................... G09B 15/00
(52) U.S. Cl. ..................................... 434/308; 84/470 R
(58) Field of Search ........................... 434/307 A, 309, 434/433, 308–321; 381/62; 84/470 R; 446/397, 258

(56) References Cited

U.S. PATENT DOCUMENTS 6,252,153 B1 * 6/2001 Toyama .................. 434/307 A

OTHER PUBLICATIONS

Cedarmont Music, Cedarmont Kids Classics, Coyrights 1993, "Sunday School Songs" and "Songs of Praise", Copyrights 1993, audio tape contents and cassette slip cover with lyrics.*

USBorne House, "The USBorne Book of Christmas Carols", 1989, American Edition.*

Hal Leonard, The Greatest Guitar Songbook, Copyright 1999, The Hal Leonard Corporation.*

Marty Haugen, "Celebration Series" from the collection "All Are Welcome", Copyright 1994, 1995, G.I.A. Publications, Inc., "The Hand of God Shall Hold You" booklet for choir, cantor, congregation, guitar, keyboard and woodwind in C.*

* cited by examiner

Primary Examiner—Derris H. Banks
Assistant Examiner—Kurt Fernstrom
(74) Attorney, Agent, or Firm—J. E. Brunton

(57) ABSTRACT

The invention is a method of teaching an individual how to correctly sing a song by using visual display that is displayed to the individual synchronously with the playing of the audio portion of the song. A plurality of visual cues included in the visual display guides the individual in following the musical tones in the song that is played along with the display of the visual cues. The visual display can be made available for use in a variety of ways such as on CDs, on the Internet, and the like. Alternatively, the visual display can be published in a printed publication for use with an audio recording of the song.

12 Claims, 4 Drawing Sheets

The symbols for chest, middle and head tell you which voice to be in where.

When you see this symbol go for a nice, relaxing diaphragmatic breath.

When you see this symbol, add vibrato to that particular word.

When you see the word that is CAPITALIZED, make it louder.

Every night in my dreams  I see you  I feel you  that is how I know you go on

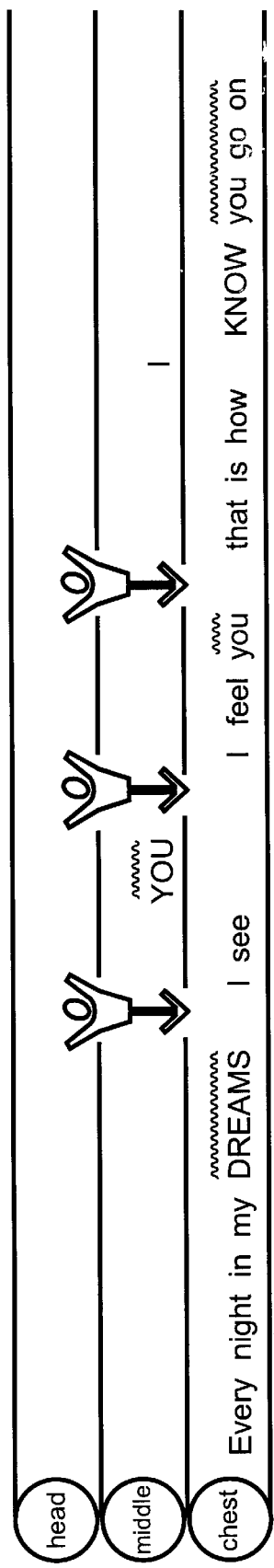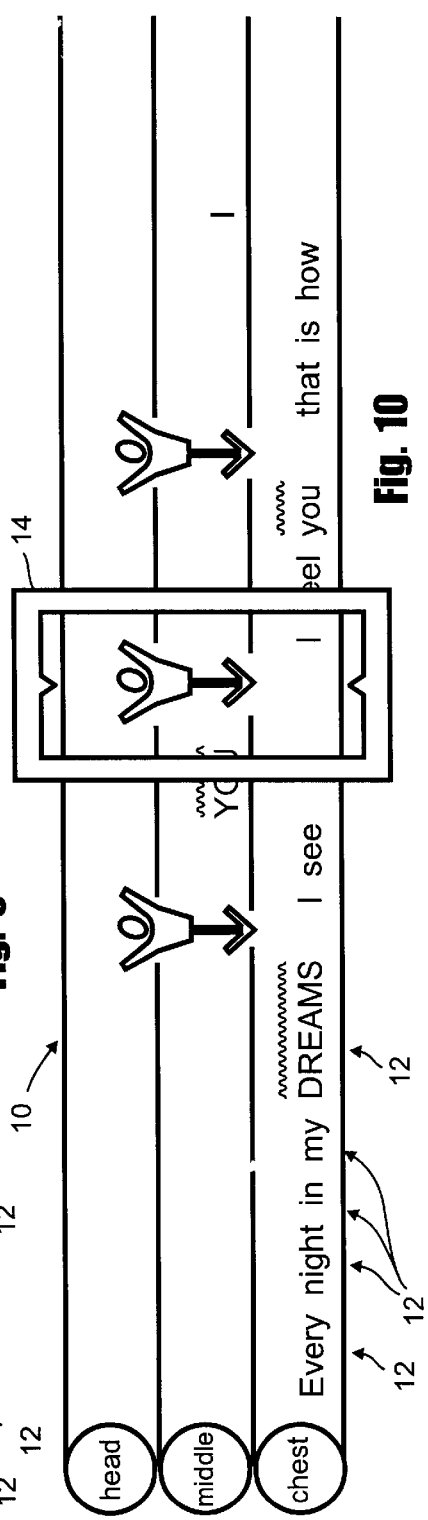

METHOD OF SINGING INSTRUCTION

BACKGROUND OF THE INVENTION

1. Field of the Invention

The invention relates generally to instructional singing. More particularly, the invention concerns a method for teaching an individual to correctly sing a selected song using a novel visual display. The visual display comprises a string of discrete visual segments that are displayed synchronously with the playing of the audio portion of the song. The visual display guides the individual in following the musical tones in the song, and if desired, can be viewed along with only the instrumental portion of the song. Alternatively the visual display can be published in book, pamphlet or sheet music form for use by an individual in conjunction with playing a recording of the song.

2. Description of the Prior Art

Singing instruction with professional experts has been provided previously. However, such instruction has been expensive and generally available in limited geographic locations such as metropolitan areas. Such instruction often requires a student to travel to the studio of the instructor, which is often inconvenient and time consuming.

Another form of entertainment is known as Karaoke. Karaoke is an audio-visual entertainment system that plays an accompaniment to a song followed with the words on a video screen. Undesirably, Karaoke does not assist the individual in singing the song according to the proper musical tones intended by the songwriter or singer. Instead, Karaoke merely plays the instrumentals of a song with the vocals removed while visually displaying the words of the vocals. Thus, Karaoke provides no technical vocal guidance to the singer, which allows the individual to improperly sing the technical vocal requirements of the song. This is, however, often the desired result when Karaoke is used for comedic or entertainment purposes.

Thus, there is a need to develop a method to instruct individuals to sing in accord with the proper vocal placement intended by the songwriter. There is also a need to provide such a method that is easily accessible and simple to learn and does not require the knowledge of reading sheet music. There is also a need to provide such a method that allows the individual to select whether or not the vocals of the song are played with the instrumentals.

These and other difficulties of the prior art have been overcome according to the present invention.

BRIEF SUMMARY OF THE INVENTION

The present invention relates to a method of making an audio-visual recording of any song for use by an individual for singing practice. In a preferred embodiment of the invention the method comprises first obtaining an audio recording of a song having both an instrumental portion and a vocal portion. Next, a written record of the vocal portion of the audio recording is produced. The audio recording of the song is then partitioned into a string of discrete time segments where each time segment is selected according to discernible audio characteristics in the audio recording. This done, the written record is then partitioned into a string of discrete phrase segments with each phrase segment corresponding to a discrete time segment of the string of discrete time segments. Pause segments are then inserted into the string of discrete phrase segments to correspond to discrete time segments having no vocal portion.

The discrete phrase segments are then modified in accordance with the discernible audio characteristics found in their corresponding discrete time segments of the audio recording of the song to establish a visual display comprising a string of discrete visual segments. The visual display is then synchronously displayed along with the playing of the audio recording of the audio song to the individual. In this way, the individual is uniquely provided visual assistance in executing the various musical tones carried out in the singing of the lyrics of the song. In one embodiment of the invention, a location indicator is provided to identify the location on the string of discrete visual segments that is then being heard by the student.

The modifications made to the discrete phrase segments are kept to a minimum in order to eliminate complexity to the audio-visual recording. For instance, most individuals do not have an understanding of sheet music, which is often complex and difficult to understand. Thus, providing visual guidance to an individual learning to sing is self-defeating if the guidance provided exhibits the same amount of complexity as that found in sheet music. Such complexity is self-defeating for teaching most people. In one embodiment of the present invention, each discrete phrase segment is first categorized as either a low vocal note, a high vocal note, or a middle range vocal note. Then, the written words of discrete phrase segments that are to be sung at a higher volume, that is louder, are converted into capital letters. Finally, those discrete phrase segments that are to be sung with vibrato, that is, with wavelike movement of the pitch at a sustained or held note, are overscored with a symbol in the form of a wavy line. In this embodiment, these are the only modifications necessary in providing the visual guidance needed to teach most individuals how to sing.

In one embodiment of the invention, the discrete visual segments are displayed in a top tier, a bottom tier, and a middle tier. The top tier is for displaying the discrete visual segments that have been categorized as high vocal notes, the bottom tier is for the display of those segments categorized as low vocal notes, and the middle tier for those discrete visual segments that have been categorized as middle vocal notes. This approach has been shown to provide a great visual assistance to those using the instructional audio-visual recording for singing instruction.

There are a number of means by which the audio-visual recording can be made available for individual use in singing instruction. For example, the audio-visual recordings can be made available on compact disks for display on a computer, or on videocassette or DVD for display on a television, or made available on a server for display on remote computers that are connected to receive data from the server. Alternatively, a published version of the visual portion of the recording in pamphlet of book format can be provided, in which case the individual can read/sing the song while playing recording of the song on any conventional audio device such as record player, or the like.

BRIEF DESCRIPTION OF THE DRAWINGS

Referring particularly to the drawings for the purposes of illustration and not limitation:

FIG. 8 is a view similar to FIG. 7, but showing the addition of symbols or icons indicating when a breath is to be taken.

FIG. 9 is a view similar to FIG. 8, but showing the addition of other visual guidance symbols which are adapted to guide the student in correctly vocalizing the song.

FIG. 10 is a view similar to FIG. 9 but showing the addition of a position locating indicator that indicates the discrete phase then being heard by the student.

DETAILED DESCRIPTION OF THE INVENTION

Figure 1:
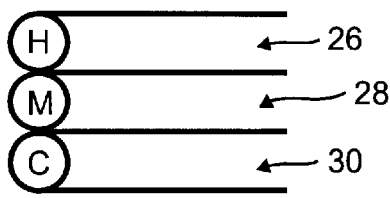
FIG. 1 is an exemplary diagram of the top, bottom, and middle tier portions of a part of the visual display of one form of the invention.
Figure 2:
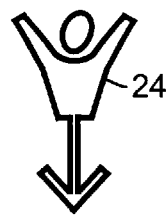
FIG. 2 is a diagram of the symbol or icon used in the visual display for indicating when a breath is to be taken.

Referring to the drawings and particularly to FIG. 10, there is illustrated one form of the visual display of the invention that is adapted for use by an individual, such as the student, for singing practice. This visual display 10 includes a string of discrete visual segments 12 and also includes a plurality of visual guidance symbols that assist the individual in replicating the appropriate vocal characteristics of the lyrics of the song. Also shown in FIG. 10 is a position locating indicator 14 that brackets the discrete visual segments 12 that are then being played as a part of the audio portion of the recording.

The method of one form of the present invention begins by obtaining an audio recording of the song to be learned that includes both an instrumental portion and a vocal portion. From this recording a written record of the vocal portion of the recording is produced. By way of illustration, FIG. 6 generally shows at 16 a portion of such a written record of the song prior to the written record being modified in the manner presently described.

Figures 6, 7:
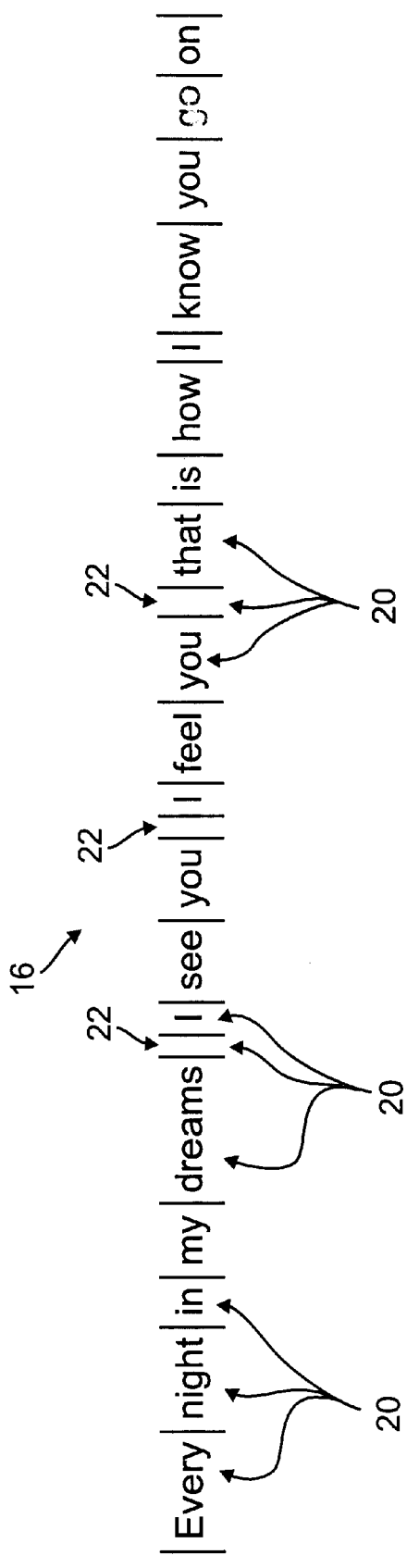
FIG. 6 shows a portion of a written record of the vocal portion of an audio recording of a song.
FIG. 7 shows the same portion of the written record of FIG. 6 after being partitioned into discrete phrase segments.

The next step in the method of the invention, is to identify the various discernible audio characteristics of the song and to partition the written record into a string of discrete segments that correspond to the audio characteristics in the recording. By way of example, such audio characteristics may include changes in volume or loudness and changes in tone found in the audio recording. As shown in FIG. 7, the partitioned written record thus produced includes a string of discrete phrase segments, generally designated in FIG. 7 by the numeral 20.

As with most songs, the vocal portion of the song includes discontinuities. Accordingly, the partitioned written record is modified by inserting at appropriate locations within the string of discrete phrase segments to indicate a discontinuity or pause in the vocal portion. These pause segments, which are generally designated in FIG. 7 by the numeral 22 indicate a discontinuity or tempo change of the character that requires a brief pause.

As illustrated in FIG. 8, the partitioned written record is further modified to include visual cues or guidance symbols, such as the diaphragmatic breath cues or icons 24 which are inserted at selected locations within the partitioned written record to indicate the most appropriate times to breathe in. In this regard, it should be understood that one might not always breathe in during a pause in the song. Accordingly, it is necessary to provide in the visual display both the breath symbols as well as the pause indications.

In addition to the inclusion of the breath icons 24, the partitioned written record is further modified to include various other cues or visual guidance symbols that correspond to the various audio characteristics of the song. These added symbols further assist the individual in correctly singing the song (see FIG. 9). However, these modifications are preferably kept to a minimum in order to avoid undue complexity which can be counter-productive to effectively teaching the student to correctly sing the particular song.

In the form of the method of the present invention illustrated in the drawings, there are three different modifications made to the partitioned record to produce a final display that is adapted to assist the student in correctly singing the song. More specifically, in accordance with the first modification, each discrete phrase segment in the partitioned written record is categorized as either a low vocal note, a high vocal note, or a middle vocal note. As depicted in FIG. 10, the final visual display includes a top tier 26, a middle tier 28, and a bottom tier 30. Discrete phrase segments categorized as low vocal notes are displayed in the bottom tier 30. Those categorized as high vocal notes are displayed in the top tier 26, and those categorized as middle vocal notes are displayed in the middle tier 28.

Figure 3:
FIG. 3 is a diagram of the overscore symbol used in the visual display for indicating when a discrete visual segment is to be sung with vibrato.
Figure 4:
FIG. 4 shows the manner of indicating to the student when a discrete visual segment is needed to be sung more loudly or at higher volume.

As part of the second modification, those discrete phrase segments that are to be sung at louder or at higher volume are capitalized as indicated in FIG. 4 at 32. Third, those discrete phrase segments that are to be sung with vibrato, that is, with wavelike movement of the pitch at a sustained or held note, are annotated with the overscore shown at 34 in FIG. 3. Uniquely, the annotated overscore and the capitalization of higher volume phrases can occur for the same discrete phrase segment residing in any of the three tiers.

Figure 5:
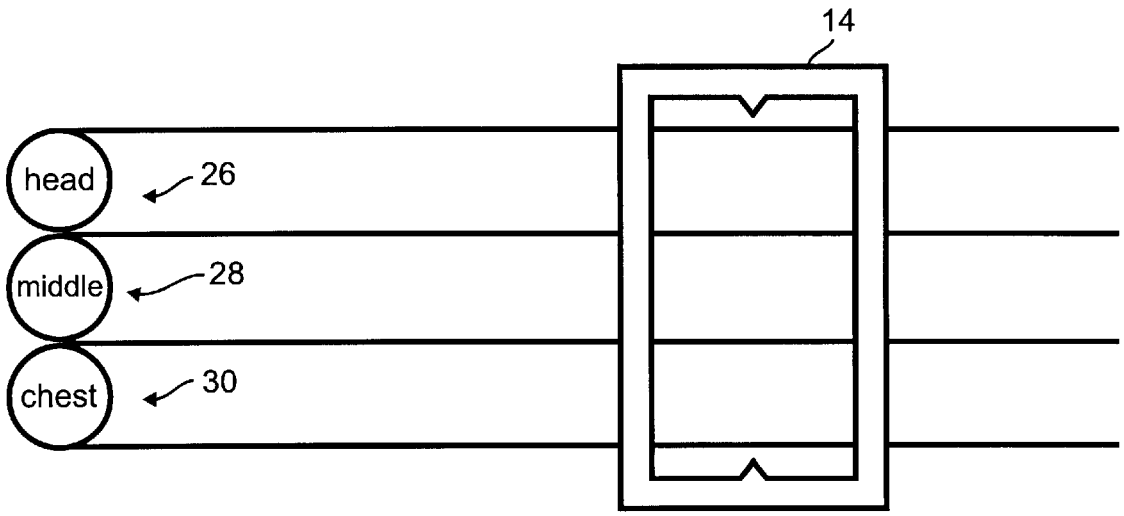
FIG. 5 is a diagram showing a location indicator being used along with the top, bottom, and middle tier portion of the visual display.

In one embodiment of the invention, the final visual display is linked with the audio recording of the particular song being practiced so that the playing of the audio recording can be carried out simultaneously and synchronously with the display to the student of a final visual display such as that shown in FIG. 10. This embodiment is well suited for applications where the audio-visual recordings can be made available on Compact Disks for display on a computer, on video cassette, music video or DVD for display on a television, or on a server for display on remote computers that are connected to receive data from the server. Preferably, the indicator 14 is provided to point to the string of discrete visual segments then being played by the recording of the song (FIG. 5). As shown in FIG. 5, the top, bottom, and middle tiers appear stationary as does the indicator 14, while the string of discrete visual segments scroll by synchronously with the playing of the audio portion of the song.

Alternatively, a second recording can be produced that permits the individual to view the final visual display while playing the audio recording of the song without the original vocal portions found in the first recording. This is desirable because once the individual believes that he or she has mastered the singing of a particular song, the individual can then sing that song along with the only instrumental portion of the song. Using this second recording, the individual can better judge the quality of his or her singing without vocal interference.

Figure 11:
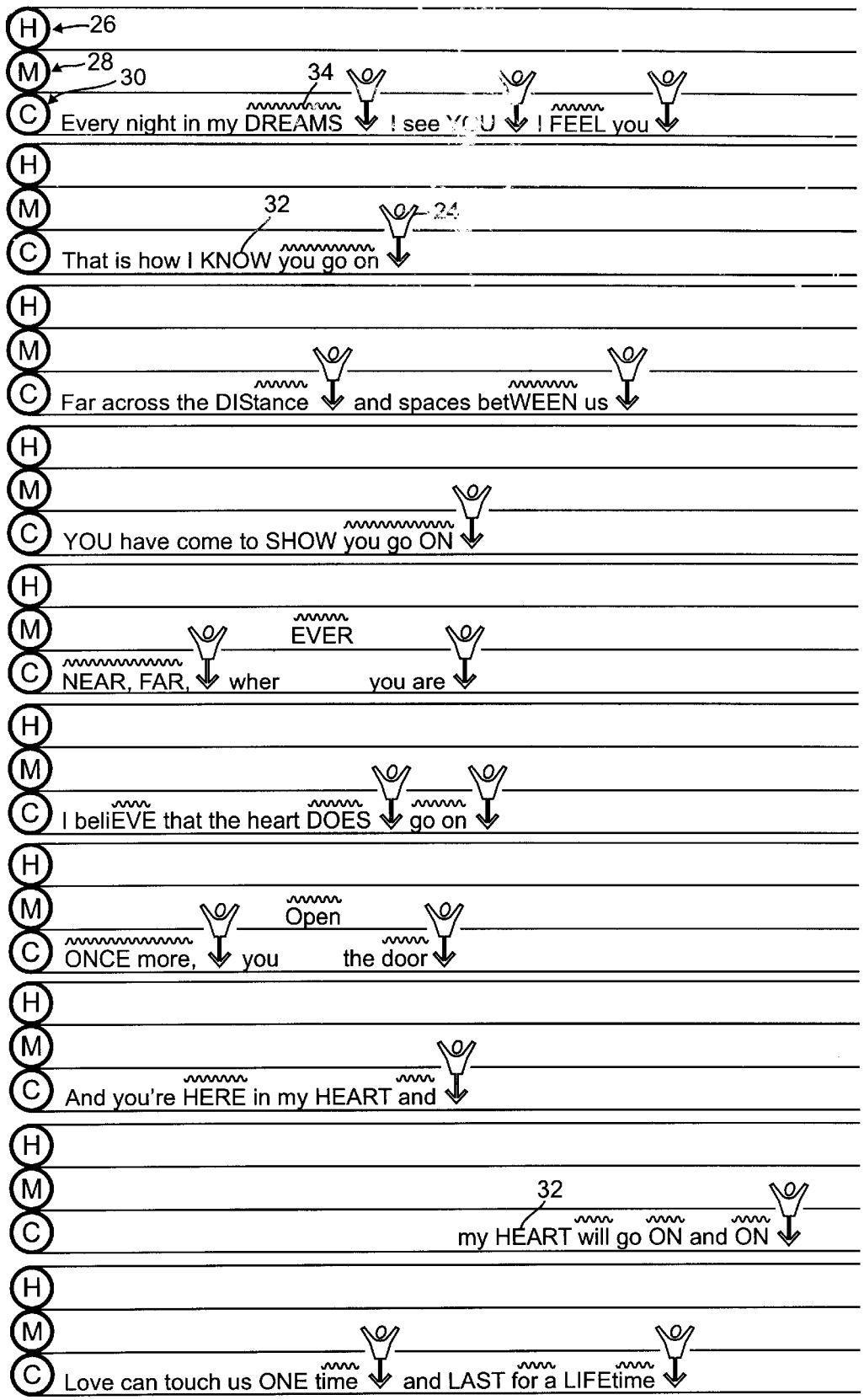
FIG. 11 shows a portion of an alternate form of visual display of the invention that can be published in pamphlet format.

As indicated in FIG. 11, in yet another embodiment of the invention, the final visual display can be published in print, as for example in book, pamphlet, or sheet music form. In this embodiment of the invention, the individual must follow the book or pamphlet on their own while playing the song on a conventional audio device such as a tape recorder, a stereo, music video or the like.

Referring particularly to FIG. 11, it is to be observed that the top tier 26 of the final visual display there shown is designated by the letter "H" which is short for the words "Head Voice. This designation functions to identify the high notes which are often associated with vocal efforts resonating in the nasal sinus head area and are pitchwise, considerably higher than normal speaking range. The bottom tier 30 is designated by the letter "C" which is short for the words "Chest Voice". This designation functions to identify the low notes that are often associated with vocal efforts resonating in the upper chest area of the body. The middle tier 28 is designated by the letter "M" which is shorter for the words "Middle Voice". This designation functions to identify the middle tones which are the tones that most people have difficulty singing because they tend to use vocal efforts from both the chest area and the head area. The single letter designations, rather than the "head", "middle" and "chest" designations used in FIGS. 1, 5, 8, 9 and 10, are preferred where the publication of the string of discrete visual segments is rather small, as would be the case in small handheld pamphlets and the like. Although the combination of "C", "M", and "H", and "Chest", "Middle", and "Head" are used to designate the three tiers, other combinations may be used, if desired, as, for example, "High", "Middle", and "Low", or the like.

What has been described are preferred embodiments in which modifications and changes may be made without departing from the spirit and scope of the accompanying claims.

What is claimed is:

1. A method of teaching an individual who does not have the knowledge of reading sheet music how to correctly sing a song having discernible audio and physical characteristics and including an instrumental portion and a vocal portion having discontinuities, the method comprising the steps of:
   (a) obtaining a first audio recording of the song comprising a vocal and an instrumental portion;
   (b) producing from the first audio recording, a written record of the vocal portion thereof;
   (c) partitioning said written record into a string of discrete phrase segments to form a partitioned record;
   (d) inserting pause segments into said partitioned record to produce a modified partitioned record, each said pause segment corresponding to a discontinuity in the vocal portion of the song;
   (e) producing a visual display by adding visual cues to said modified partitioned record to indicate to the individual the correct way to vocalize the written record; said visual cues corresponding to selected discernible audio characteristics of the song;
   (f) producing from the first audio recording a second audio recording comprising an instrumental portion; and
   (g) playing the first audio recording of the song while simultaneously and synchronously displaying to the individual said visual display.

2. The method of teaching as defined in claim 1 in which said visual cues include capitalizing a selected discrete phrase segment to indicate to the individual that said capitalized discrete phrase segment is to be loudly vocalized.

3. The method as defined in claim 1 in which said visual cues comprise a visual guide symbol that indicates to the individual that a breath is to be taken.

4. The method of teaching as defined in claim 1 in which said visual cues comprise a visual guide symbol associated with a selected discrete phrase segment to indicate to the individual that said discrete phrase segment is to be vocalized with vibrato.

5. The method of teaching a s defined in claim 1 further comprising the step of modifying said modified partitioned record by providing a position locating indicator to identify on the visual display the discrete visual segment that is being heard by the individual during the playing of said first audio recording of the song.

6. The method of teaching as defined in claim 1 including the further step of producing a final visual display by modifying said modified partitioned record to display selected discrete phrase segments in a selected one of a top tier, a bottom tier, and a middle tier, said top tier displaying discrete visual segments categorized as high vocal notes, said bottom tier displaying discrete visual segments categorized as low vocal notes, and said middle tier displaying discrete visual segments categorized as middle vocal notes.

7. A graphical method of teaching an individual who does not have the knowledge of reading sheet music how to correctly sing a song having discernible audio characteristics and including an instrumental portion and a vocal portion having discontinuities, the method comprising the steps of:
   (a) obtaining a first audio recording of the song comprising a vocal and instrumental portion;
   (b) producing from the first audio recording, a written record of the vocal portion thereof;
   (c) partitioning said written record into a string of discrete time and phrase segments to form a partitioned record the discrete visual segments thereof corresponding to the discernible audio characteristics of the song;
   (d) producing a visual display by adding visual cues to said written record to indicate to the individual the correct way to vocalize each said discrete phase segment, said visual cues corresponding to selected discernible audio characteristics of the song and comprising:
      (i) a capitalized discrete phrase segment indicating to the individual that said capitalized discrete phrase segment is to be more loudly vocalized;
      (ii) a visual guide symbol associated with a selected discrete phrase segment to indicate to the individual that said discrete phrase segment is to be vocalized with vibrato; and
      (iii) a visual guide symbol indicating to the individual that a breath is to be taken; and
   (e) playing the first audio recording of the song while simultaneously and synchronously displaying to the individual said visual display.

8. The method of teaching as defined in claim 7 further comprising the step of modifying said partitioned record by providing a position locating indicator to identify on the visual display the discrete visual segment that is being heard by the individual during the playing of said first audio recording of the song.

9. The method of teaching as defined in claim 8 including the further step of producing a final visual display by modifying said partitioned record to display selected discrete phrase segments in a selected one of a top tier, a bottom tier, and a middle tier, said top tier displaying discrete visual segments categorized as high vocal notes, said bottom tier displaying discrete visual segments categorized as low vocal notes, and said middle tier displaying discrete visual segments categorized as middle vocal notes.

10. The method of teaching as defined in claim 9 further comprising the steps of:
   (a) producing from said first audio recording of the song a second audio recording of the song that includes only the instrumental portion; and
   (b) playing said second audio recording simultaneously and synchronously with displaying to the individual said final visual display.

11. A graphical method of teaching an individual having no ability to read sheet music how to correctly sing a song having discernible audio characteristics and including an instrumental portion and a vocal portion having discontinuities, the method comprising the steps of:
   (a) obtaining a first audio recording of the song comprising a vocal and an instrumental portion;
   (b) producing from the first audio recording, a written record of the vocal portion thereof;
   (c) partitioning said written record into a string of discrete time and phrase segments to form a partitioned record the discrete visual segments thereof corresponding to the discernible audio characteristics of the song;
   (d) inserting pause segments into said partitioned record to produce a modified partitioned record, each said pause segment corresponding to a discontinuity in the vocal portion of the song;
   (e) producing a visual display by adding visual cues to said written record to indicate to the individual the correct way to vocalize each said discrete phrase segment, said visual cues corresponding to selected discernible audio characteristics of the song and comprising:
      (i) a capitalized discrete phrase segment indicating to the individual that said capitalized discrete phrase segment is to be more loudly vocalized;
      (ii) a visual guide symbol associated with a selected discrete phrase segment to indicate to the individual that said discrete phrase segment is to be vocalized with vibrato; and
      (iii) a visual guide symbol indicating to the individual that a breath is to be taken; and
   (f) producing a final visual display by modifying said partitioned record to display selected discrete phrase segments in a selected one of a top tier, a bottom tier, and a middle tier, said top tier displaying discrete visual segments categorized as head voice notes, said bottom tier displaying discrete visual segments categorized as chest voice notes, and said middle tier displaying discrete visual segments categorized as middle voice notes;
   (g) playing the first audio recording of the song while simultaneously and synchronously displaying to the individual said visual display; and
   (h) producing from said first audio recording of the song a second audio recording of the song that includes only the instrumental portion; and
   (i) playing said second audio recording simultaneously and synchronously with displaying to the individual said final visual display.

12. The method of teaching as defined in claim 11 further comprising the step of modifying said partitioned record by providing a position locating indicator to identify on the visual display the discrete visual segment that is being heard by the individual during the playing of said first audio recording of the song.

* * * * *